United States Patent [19]

Grieshaber et al.

[11] Patent Number: 4,791,904
[45] Date of Patent: Dec. 20, 1988

[54] METHOD FOR ASSURING EMERGENCY DRIVING FUNCTIONS FOR A VEHICLE HAVING A DIESEL ENGINE

[75] Inventors: Hermann Grieshaber, Stuttgart; Peter Schueler, Leonberg; Jürgen Wietelmann, Hirschlanden, all of Fed. Rep. of Germany

[73] Assignee: Robert Bosch GmbH, Stuttgart, Fed. Rep. of Germany

[21] Appl. No.: 111,365

[22] Filed: Oct. 20, 1987

[30] Foreign Application Priority Data

Nov. 4, 1986 [DE] Fed. Rep. of Germany ....... 3637510

[51] Int. Cl.$^4$ .................................. F02M 39/00
[52] U.S. Cl. ............................... 123/479; 123/381; 123/359
[58] Field of Search ............... 123/357, 358, 359, 479, 123/198 D, 381

[56] References Cited

U.S. PATENT DOCUMENTS

| 4,174,694 | 11/1979 | Wessell | 123/381 |
| 4,274,381 | 6/1981 | Abo | 123/479 |
| 4,493,304 | 1/1985 | Nakajima | 123/479 |
| 4,531,495 | 7/1985 | Yamato | 123/479 |
| 4,541,380 | 9/1985 | Oshizawa | 123/475 |
| 4,556,029 | 12/1985 | Yamaguchi | 123/479 |
| 4,587,615 | 5/1986 | Takahashi | 123/479 |
| 4,615,321 | 10/1986 | Haefner | 123/479 |

FOREIGN PATENT DOCUMENTS

| 0153932 | 9/1984 | Japan | 123/381 |
| 0006029 | 1/1985 | Japan | 123/479 |

Primary Examiner—Carl Stuart Miller
Attorney, Agent, or Firm—Walter Ottesen

[57] ABSTRACT

The invention is directed to a method for assuring emergency driving functions with a diesel engine when the fuel temperature sensor fails, the diesel engine having a charging-air blower and a charging-air temperature sensor. The method includes performing a fuel temperature dependent correction of specific operating functions by taking the charging air temperature as a basis such that all functions corresponding to a fuel temperature of $T_K = +20°$ C. are fulfilled at a charging air temperature of $T_L \geq 0°$ C. and all functions corresponding to a fuel temperature of $T_K = -10°$ C. are fulfilled at a charging air temperature of $T_L < 0°$ C. The functions include the start control path, starting speed, idle speed, control path correction, and basic quantity control.

4 Claims, 1 Drawing Sheet

METHOD FOR ASSURING EMERGENCY DRIVING FUNCTIONS FOR A VEHICLE HAVING A DIESEL ENGINE

FIELD OF THE INVENTION

The invention relates to a method for assuring emergency driving functions for a vehicle equipped with a diesel engine having a charging air blower and a charging air sensor when there is a failure of the fuel temperature sensor.

BACKGROUND OF THE INVENTION

Many of the functions for the operation of a diesel engine are functions dependent upon the temperature of the fuel so that it is known to provide a fuel temperature sensor. This sensor can be, for example, mounted in the center of the injection pump suction chamber. In this way, it is possible with a diesel engine to assign an appropriate mass of fuel to the air mass conducted to the engine in combination with an electronic control which is known as EDC or electronic-diesel-control. However, the required volume of fuel must be corrected in dependence upon fuel temperature pursuant to an experimentally determined association to inject the appropriate mass of fuel for a specific air mass and predetermined rotational speed. This is known as the so-called full-load control-path correction. The full-load control-path correction and a plurality of other fuel temperature dependent functions such as start control path, starting rotational speed, idle rotational speed and basic-quantity control and the like can be carried out by means of electronic diesel control when corresponding fuel temperature data is present. From this, one recognizes that the fuel temperature data for many functions of the EDC-apparatus are important and at first apparently appear to be an absolute requirement.

SUMMARY OF THE INVENTION

On the other hand, a malfunction of the fuel temperature sensor can not be excluded. Accordingly, it is an object of the invention to provide good emergency driving functions even if such a malfunction occurs. In this connection, attention is given to the fact that a cooling water temperature sensor whose temperature signal could at least take over a few of the above-mentioned fuel temperature dependent functions is not available because of cost considerations.

The method according to the invention assures emergency driving functions with a diesel engine when the fuel temperature sensor fails, the diesel engine being equipped with a charging-air blower and a charging air temperature sensor. The method includes performing a fuel temperature dependent correction of such functions which are dependent upon the fuel temperature $T_K$ by taking the temperature data of the charging air as a basis. These functions include: start control path, starting speed, idle speed, control path correction, and basic quantity control.

The method according to the invention affords the advantage that even though the charging air temperature for a diesel motor often takes on other values than the fuel temperature, a temperature correction with the charging air temperature $T_L$ is nonetheless possible within definite temperature limits and can be carried out. This will be shown in the following and has been arrived at from basic investigations. This surprising result makes it possible to ensure emergency operating characteristics for diesel engines even when the fuel temperature sensor malfunctions and thus in the situation wherein good emergency functions could not be previously realized.

The realization of the invention is without difficulty and therefore possible without greater additional cost when viewed in the context of complexity and the switch-over possibilities required because of the utilization of the invention. This situation occurs because only simple appropriate software changes are needed for the EDC-apparatus for diesel engines because of the utilization of microprocessors. That is, an expansion of the program range is required so that at all locations where fuel temperature data for further processing is required, use can be made of the temperature data of the charging air.

For all fuel temperature dependent functions for the operation of a diesel engine, the invention therefore makes it possible to obtain usable emergency driving functions for which:

(a) the engine is adequately protected;
(b) no minimal power occurs which is too great;
(c) the driving safety is assured; and,
(d) the cold start functions.

The operating person is informed as to the malfunction of a fuel temperature sensor by means of a diagnosis warning lamp as is conventional with the operation of diesel engines and here preferred and especially in the application area for trucks.

The invention therefore avoids the necessity to utilize an established fixed value in the fuel temperature data which could, for example, be $T_K = -10°$ C. when the fuel temperature sensor malfunctions. This fixed value then applies for all operating conditions an temperatures and allows only substantially affected emergency functions. With the utilization of the invention, such set temperature data is only then required when the charging air temperature sensor too is defective and then as an addition to the temperature sensor for the feel; a situation which should only occur very rarely.

According to another feature of the invention, the temperature correction with the charging air temperature ($T_L$) is performed within definite temperature limits such that all functions corresponding to a fuel temperature of $T_K = +20°$ C. are fulfilled at a charging air temperature of $T_L \geq 0°$ C. and all functions corresponding to a fuel temperature of $T_K = -10°$ C. are fulfilled at a charging air temperature of $T_L < 0°$ C.

Pursuant to this feature of the invention, the provision of definite temperature boundaries in establishing a temperature correction via the charging air temperature is especially advantageous in that for a charging air temperature of, for example, over 0° C., a predetermined set value of an assumed fuel temperature (for example, +20° C.) is worked with; whereas, for a charging air temperature below 0° C., all functions to be explained below are fulfilled when taking as a basis a fuel temperature of, for example, −10° C.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
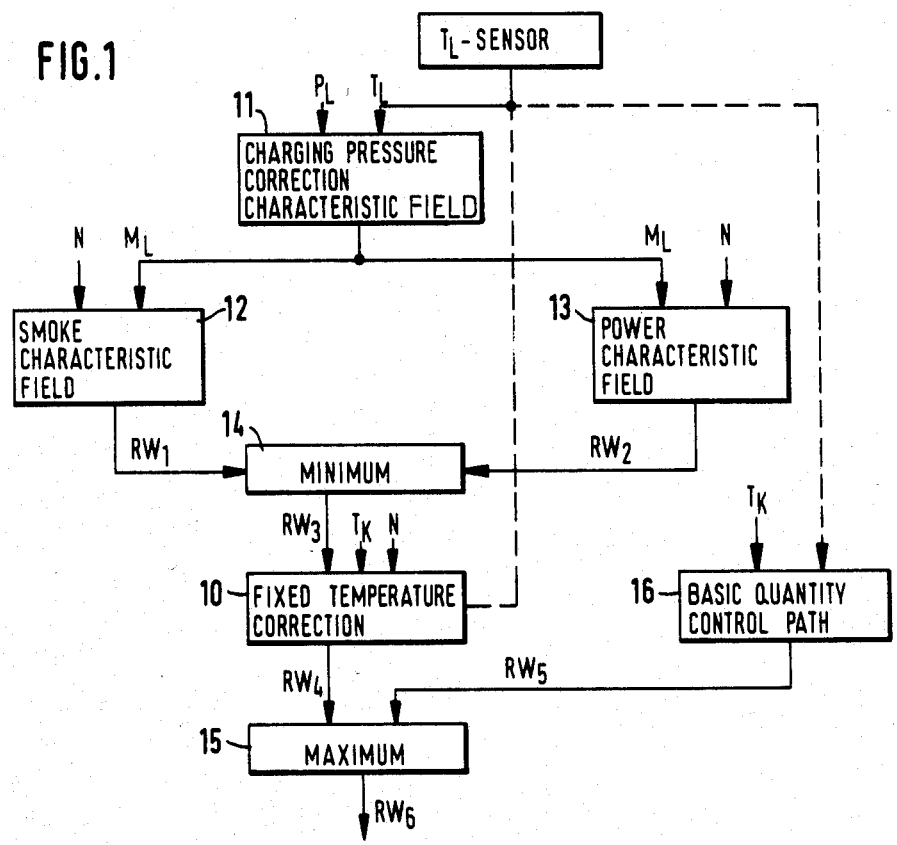
FIG. 1 is a block diagram for the control path RW of the fuel injection pump in the area of the functions of rotational speed limiting and basic quantity for which a fuel temperature correction likewise interjects; and, FIG. 2 is a simplified schematic of a flow diagram and shows one embodiment of the method of the invention.

The following embodiments are referred especially to engines for trucks; however, they should not be viewed as limiting with respect to the invention, also not with respect to their numerical values. For diesel engines, the following main functions are in any event dependent upon fuel temperature and therefore require the input of fuel temperature as a quantity to be processed for the orderly operation of the engine:

1. Starting control path
2. Starting rotational speed
3. Idle rotational speed, for example:
   3.1 $n_{LL} = 500$ min$^{-1}$
   3.2 $n_{LL} = 700$ min$^{-1}$ for t=2 min at $t_K \leq -5°$ C.
4. Control path - correction
5. Basic quantity control and reasons therefore:
   5.1 program duration
     5.1.1 controller dynamics and controller stability
   5.2 underbraking
   5.3 maximal permissible no-load control path
6. control path limitation for defective system rotational speed sensor In the block diagram of FIG. 1 the functions of rotational speed limiting and basic quantity correspond to the block diagram and are applicable to an EDC-apparatus for the operation of a diesel engine. FIG. 1 shows a block 10 which serves to correct fuel temperature without which the functions could not be carried out.

With reference to FIG. 1, it is noted that the individual components and blocks can be assembled in analog, digital or hybrid form and can be configured to be entirely or partially grouped together and can include appropriate areas of program-controlled digital systems such as microprocessors, microcomputers, digital logic circuits and the like. The blocks shown in FIG. 1 for the most part therefore illustrate software regions of the EDC-apparatus and include a charging air correction block 11 to which the charging air pressure $P_L$ and the charging air temperature $T_L$ is supplied on the input end. From these two inputs, a charging pressure correction air mass value $M_L$ is provided which is supplied to a block identified as smoke characteristic field 12 and to a block identified as power characteristic field 13. The rotational speed input N is also supplied to both blocks. At the output of the smoke characteristic field block, a first control path value RW1 is provided as the first input quantity to a minimum evaluation circuit 14 which receives a control value input RW2 from power characteristic field block 13. The selected control value RW3 is applied to the fuel temperature correction block 10 mentioned above which carries out the control path correction with a consideration of the rotational speed N. The fuel temperature correction block 10 supplies a control path value RW4 to a maximum-selection circuit 15 at its output end. A basic-quantity characteristic block 16 supplies $T_K$-dependent control value data RW5 of the basic-quantity control to the maximum selection circuit 15. Finally, the current control path value RW6 is at the output of the maximum selection circuit 15. The control path value RW6 determines the quantity of fuel to be metered to the diesel engine via the injection pump.

Figure 2:
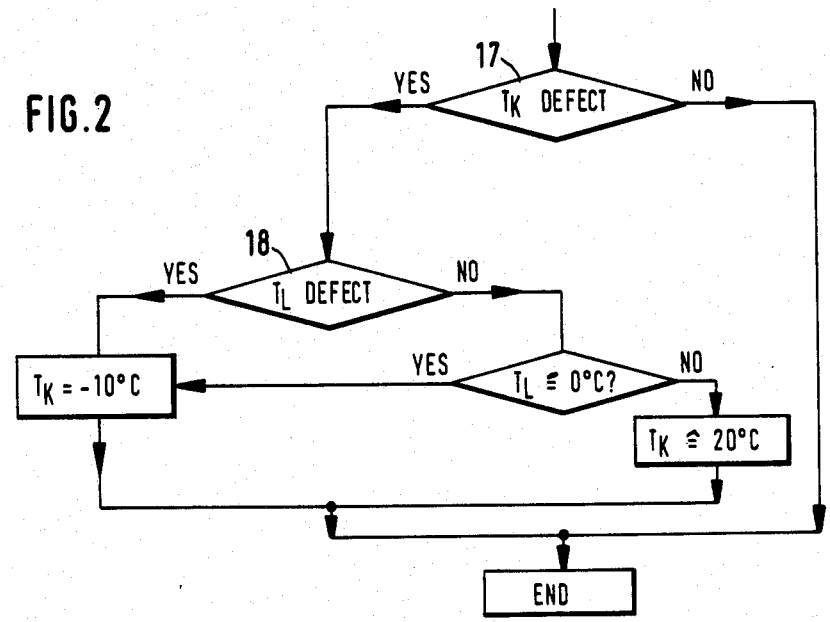

With the invention, an examination is carried out in correspondence to the flow diagram of FIG. 2 as to whether the fuel temperature sensor is defective (block 17). If the fuel temperature sensor is detected as being defective, then it is determined whether the charging air temperature sensor is also defective (block 18). If the charging air temperature sensor is shown to be functional, then the charging air temperature input $T_L$ is evaluated for the realization of the fuel temperature dependent functions 1 to 5 which are delineated in the description t follow. However, the condition is added that the temperature correction with the charging air temperature value $T_L$ is carried out only within definite temperature limits since it is not possible to exclude that the charging air temperature $T_L$ can often take on other values than the fuel temperature. Accordingly, the following condition is applicable: if the charging air temperatures are the same or greater than 0° C ($T_L \geq 0°$ C.), then all functions corresponding to a fuel temperature of $T_K = +20°$ C. are fulfilled. On the other hand, if the charging air temperature is beneath 0° C. ($T_L < 0°$ C.), then all functions corresponding to a fuel temperature of $T_K = -10°$ C. are fulfilled.

The basic concept of the invention is that it is possible to apply the charging air temperature in lieu of the fuel temperature input for realizing comparatively good emergency driving situations for diesel engines. This basic concept also includes the idea to continue to work with the variable charging air temperatures without the above-mentioned "two-point version with the assumed set values for the fuel temperature". However, the mentioned constant limit values are preferred for the fuel temperature in the realization of the fuel temperature dependent functions.

The following observations are directed to investigations made on an empirical basis and prove that for all criteria which is to be considered in this connection and in all cases which are theoretically conceivable, the transition to the utilization of the charging air temperature input is permissible; stated otherwise, the following will show that for none of the fuel temperature dependent functions given in the material above and in all theoretically conceivable boundary situations, a case can occur which can not lead to an at least usable emergency driving function.

The following examples include a table-like illustrative form which considers for each of the fuel temperature dependent functions the three possibilities that the fuel temperature is either equal to, greater than or less than the charging air temperature in the actual emergency driving function. Then on the righthand side, the consequences which arise for each function considered are given for the conditions provided in the lefthand column.

| 1. Start control path with $T_L$ in lieu of $T_K$ | |
| --- | --- |
| 1.1 $T_L = T_K$ | |
| $T_L = \leq -10°$ C. | same start quantity as with $T_K$-sensor |
| $T_L = > -10°$ C. to $<0°$ C. | greater start quantity as with $T_K$-sensor |
| $T_L = 0°$ C. to $<20°$ C. | slightly less start quantity than with $T_K$-sensor |
| $T_L = 20°$ C. | same start quantity as with $T_K$-sensor |
| $T_L = >20°$ C. to $\cong 65°$ C. | slightly greater start quantity than $T_K$-sensor |
| 1.2 $T_L < T_K$, for example $T_{Kmax} \cong 70°$ C. | |
| $T_L = \leq -10°$ C. | inconceivable case |
| $T_L = > -10°$ C. to $<0°$ C. | inconceivable case |

1. Start control path with $T_L$ in lieu of $T_K$

| | |
|---|---|
| $T_L = 0°$ C. to $<20°$ C. | slightly greater start quantity than with $T_K$-sensor |
| $T_L = 20°$ C. | slightly greater start quantity than with $T_K$-sensor |
| $T_L = >20°$ C. to $\cong 65°$ C. | slightly greater start quantity than with $T_K$-sensor |
| 1.3 $T_L > T_K$ (for example, $T_{Kmin} = -20°$ C.)* | |
| $T_L = \leq -10°$ C. | same start quantity as with $T_K$-sensor |
| $T_L = >-10°$ C. to $<0°$ C. | same start quantity as with $T_K$-sensor |
| $T_L = 0°$ C. to $<20°$ C. | smaller start quantity than with $T_K$-sensor |
| $T_L = 20°$ C. | smaller start quantity than with $T_K$-sensor |
| $T_L = >20°$ C. to $\cong 65°$ C. | inconceivable case |

*below this value, starting assistance means are required.

The notation of the "inconceivable case" is easily interpretable from a general understanding that, for example, a charging air temperature of below $-10°$ C. or between $-10°$ C. and $0°$ C. is then not conceivable if, at the same time, a high fuel temperature is present because in this case, the charging air temperature is likewise high because of the conditions associated with the diesel engine.

The cases given in item 1.3 are theoretically only possible for a restart of the diesel engine after a short running time and a short standing time, that is, with a warm combustion chamber. However, in this case, the start occurs even with a smaller amount of starting quantity.

2. Start control path - starting speed with $T_L$ in lieu of $T_K$

| | |
|---|---|
| 2.1 $T_L = T_K$ | |
| $T_L = \leq -10°$ C. | same start-up speed as with $T_K$-sensor |
| $T_L = >-10°$ C. to $<0°$ C. | greater start-up speed than with $T_K$-sensor |
| $T_L = 0°$ C. to $<20°$ C. | lower start-up speed than with $T_K$-sensor |
| $T_L = 20°$ C. | same start-up speed as with $T_K$-sensor |
| $T_L = >20°$ C. to $\cong 65°$ C. | same start-up speed as with $T_K$-sensor |
| 2.2 $T_L < T_K$, for example, $T_{Kmax} \cong 70°$ C. | |
| $T_L = \leq -10°$ C. | inconceivable case |
| $T_L = >-10°$ C. to $<0°$ C. | inconceivable case |
| $T_L = 0°$ C. to $<20°$ C. | same startup speed as with $T_K$-sensor |
| $T_L = 20°$ C. | same startup speed as with $T_K$-sensor |
| $T_L = >20°$ C. to $\cong 65°$ C. | same startup speed as with $T_K$-sensor |
| 2.3 $T_L > T_K$, for example, $T_{Kmin} = -20°$ C. | |
| $T_L = \leq -10°$ C. | same startup speed as with $T_K$-sensor |
| $T_L = >-10°$ C. to $<0°$ C. | same startup speed as with $T_K$-sensor |
| $T_L = 0°$ C. to $<20°$ C. | lower startup speed than with $T_K$-sensor |
| $T_L = 20°$ C. | lower startup speed than with $T_K$-sensor |
| $T_L = >20°$ C. to $\cong 65°$ C. | inconceivable case |

For the lower start control path start-up speed, the runup rotational speed can not be adequately high after start and the engine can die again. A renewed start is then require. If necessary, the programmed start process can be supported by pressing the accelerator pedal if the start speed is too low.

3. Idle rotational speed with $T_L$ in lieu of $T_K$

| | |
|---|---|
| 3.1 $T_L = T_K$ | |
| $T_L = \leq -5°$ C. | idle speed 700 min$^{-1}$, as with $T_K$-sensor |
| $T_L = >-5°$ C. to $<0°$ C. | idle speed 700 min$^{-1}$, in lieu of 500 min$^{-1}$ with $T_K$-sensor |
| $T_L = \geq 0°$ C. | idle speed 500 min$^{-1}$, as with $T_K$-sensor |
| 3.2 $T_L < T_K$, for example, $T_{Kmin} \cong 70°$ C. | |
| $T_L = \leq -5°$ C. | inconceivable case |
| $T_L = >-5°$ C. to $<0°$ C. | inconceivable case |
| $T_L = \geq 0°$ C. | idle speed 500 min$^{-1}$, as with $T_K$-sensor |
| 3.3 $T_L > T_K$, for example, $T_{Kmin} = -20°$ C. | |
| $T_L = \leq -5°$ C. | idle speed 700 min$^{-1}$, as with $T_K$-sensor |
| $T_L = >-5°$ C. to $<°$C. | idle speed 700 min$^{-1}$, as with $T_K$-sensor |
| $T_L = \geq 0°$ C. | idle speed 500 min$^{-1}$, in lieu of 700 min$^{-1}$ with $T_K$-sensor |

The increased idle speed at low temperatures (2 minutes long serves to warm the engine faster. This fast warming is the only consequence which is not realized at lower idle speed $n_{LL}$ in the emergency range "fuel temperature-sensor defect".

4. Full-load control path correction with $T_L$ in lieu of $T_K$

The required control path corrections measured at the engine at different temperatures are described by means of the following equation to a good approximation (linearized):

$$\Delta RW = a \cdot RW_{40°\,C.} \cdot \frac{T_K - 40°\,C.}{120°\,C.} \quad \text{with: } a = f(n)$$

The values given in the following are numerical for the sole purpose of providing an example and it is understood that these numerical data are directed to a special embodiment of a diesel engine and do not operate to limit the invention and are simply provided to provide a better understanding thereof.

In the rated power region, 1 mm RW corresponds to 22 mm$^3$/H injection quantity. The following listed correction injection quantities are all referred to the rated power point (145 mm$^3$/H).

| 4.1 $T_L = T_K$ ($T_{Kmax} \cong 65°$ C.) | |
|---|---|
| $T_K, T_L = -30°$ C. | as with $T_K$-sensor, approximately 33 mm$^3$/H less than at $+40°$ C. |
| $T_K, T_L = >-30°$ C. to $<0°$ C. | with $T_K$-sensor min. $-19$ mm$^3$/H, with $T_L$-sensor $-33$ mm$^3$/H, that is, max. 14 mm$^3$/H less with $T_L$-sensor |
| $T_K, T_L = 0°$ C. to $<20°$ C. | with $T_K$-sensor max. $-19$ mm$^3$/H, with $T_L$-sensor $-9.5$ mm$^3$/H, that is, max. 9.5 mm$^3$/H more with $T_L$-sensor (6.5%) |
| $T_K, T_L = 20°$ C. | as with $T_K$-sensor, approximately $-9.5$ mm$^3$/H |
| $T_K, T_L = >20°$ C. to 40° C. | with $T_K$-sensor min. $\pm 0$, with $T_L$-sensor $-9.5$ mm$^3$/H, that is, max. 9.5 mm$^3$/H less with $T_L$-sensor |
| $T_K, T_L = >20°$ C. to $\cong 65°$ C. | with $T_K$-sensor max. $+12$ mm$^3$/H, with $T_L$-sensor $-9.5$ mm$^3$/H, that is, max. 21.5 mm$^3$/H less with $T_L$-sensor |
| 4.2 $T_L < T_K$ ($T_{Kmax} \cong 65°$ C.) | |
| $T_K, T_L = -30°$ C. to $<0°$ C. | with $T_K$-sensor min. $-19$ mm$^3$/H, |

| | |
|---|---|
| | -continued |
| | with $T_L$-sensor $-33$ mm$^3$/H, that is, max. 14 mm$^3$/H less with $T_L$-sensor |
| $T_K, T_L = \geq 0°$ C. to $+20°$ C. | with $T_K$-sensor max. $-19$ mm$^3$/H, with $T_L$-sensor $-9.5$ mm$^3$/H, that is, max. 9.5 mm$^3$/H more with $T_L$-sensor (6.5%) |
| $T_K, T_L = >20°$ C. to $+65°$ C. | with $T_K$-sensor max. $+12$ mm$^3$/H, with $T_L$-sensor $-9.5$ mm$^3$/H, that is, max. 21.5 mm$^3$/H less with $T_L$-sensor |
| 4.3 $T_L > T_K$ ($T_{Kmax} \cong 65°$ C.) | |
| $T_K, T_L = -30°$ C. to $<0°$ C. | with $T_K$-sensor min. $-19$ mm$^3$/H, with $T_L$-sensor $-33$ mm$^3$/H, that is, max. 14 mm$^3$/H less with $T_L$-sensor |
| $T_K, T_L = \geq 0°$ C. to $+20°$ C. | with $T_K$-sensor max. $-19$ mm$^3$/H, with $T_L$-sensor $-9.5$ mm$^3$/H, that is, max. 9.5 mm$^3$/H more with $T_L$-sensor (6.5%) |
| $T_K, T_L = >20°$ C. to $+65°$ C. | with $T_K$-sensor max. $+12$ mm$^3$/H, with $T_L$-sensor $-9.5$ mm$^3$/H, that is, max. 21.5 mm$^3$/H less with $T_L$-sensor |

$T_K = -30°$ C. $\rightarrow -33.5$ mm$^3$/H; $T_L = +20°$ C. or higher $\rightarrow -9.5$ mm$^3$/H, that is 24 mm$^3$/H more with $T_L$ (= 16%).

Approximately 16% additional quantity is injected in the theoretically unfavorable case at the rated power point (highest engine load) with a malfunction of the fuel temperature sensor. Conventional engines sustain such an overload for a short time. However, this operating condition is less probable since it is only conceivable at full load operation directly after a cold start (extreme cold). Furthermore, at a 16% additional quantity, the exhaust gas charger delivers so much more air that the injected quantity which is program conditioned and dependent upon air mass is reduced via the combustion peak pressure branch. In this way, this additional safety arrangement prevents damaging overload for the engine.

5. Basic Quantity Control

The temperature dependent basic quantity control which will be considered in the following is required for three reasons:

1. In order to hold short the program running time for the control of the low idle speed (approximately 5 msec), the complete full-load program (approximately 20 msec) is not computed below the basic quantity.
2. The basic quantity limits the full load at idle speed $n_{LL}$ with a temperature dependent set quantity. The temperature dependent set quantity has to be low for a warm engine in order not to have too much overrun on the drive wheels when braking the vehicle below 500 min$^{-1}$ This would otherwise lead to slippage for a smooth roadway.
3. The temperature dependent fixed quantity at no-load speed $n_{LL}$ has to be increased for a cold engine in order to overcome the high engine friction. With a cold engine, this leads to higher torque at n < approximately 1,000 min$^{-1}$ while having to accept increased black smoke (temporarily).

| | 5.1 $T_L = T_K$ |
|---|---|
| $T_L = \leq -10°$ C. | same basic quantity as with $T_K$-sensor |
| $T_L = > -10°$ C. to $<0°$ C. | greater basic quantity as with $T_K$-sensor |
| $T_L = 0°$ C. to $<20°$ C. | smaller basic quantity than with $T_K$-sensor |
| $T_L = 20°$ C. | same basic quantity as with $T_K$-sensor |
| $T_L = >20°$ C. to 65° C. | same basic quantity as with $T_K$-sensor |
| 5.2 $T_L < T_K$ | |
| $T_L = \leq -10°$ C. | improbable case |
| $T_L = > -10°$ C. to $<0°$ C. | improbable case |
| $T_L = 0°$ C. to $<20°$ C. | smaller basic quantity than with $T_K$-sensor |
| $T_L = 20°$ C. | same basic quantity as with $T_K$-sensor |
| $T_L = >20°$ C. to $\cong 65°$ C. | same basic quantity |
| 5.3 $T_L > T_K$ | |
| $T_L = \leq -10°$ C. | same basic quantity as with $T_K$-sensor |
| $T_L = > -10°$ C. to $<0°$ C. | greater basic quantity than with $T_K$-sensor |
| $T_L = 0°$ C. to $<20°$ C. | smaller basic quantity than with $T_K$-sensor |
| $T_L = 20°$ C. | smaller basic quantity than with $T_K$-sensor |
| $T_L = >20°$ C. to $\cong 65°$ C. | smaller basic quantity than with $T_K$-sensor |

At smaller basic quantities than with a functioning fuel temperature sensor, the engine can die in idle. The accelerator pedal therefore has to be pressed until the engine is warm. A larger basic quantity leads temporarily to more black smoke and possibly to problems with underbraking.

6. Control Path Limitation with a Defective System Rotational Speed Sensor

The maximum permissible injected quantity must be limited in dependence upon fuel temperature in order to obtain usable starting emergency driving characteristics when there is a failure of the system rotational speed sensor. If in this case, the fuel temperature sensor likewise is detected as being defective, the substitute value formation already described goes into operation with the aid of the air temperature sensor.

| | 6.1 $T_L = T_K$ |
|---|---|
| $T_L \leq -10°$ C. | same RW limitation as with $T_K$-sensor |
| $T_L > -10°$ C. to $\leq 0°$ C. | same to greater RW limitation |
| $T_L > 0°$ C. to $\leq 20°$ C. | greater to same RW limitation |
| $T_L = 20°$ C. | same RW limits |
| $T_L > 20°$ C. | same to slightly greater RW limitation |
| 6.2 $T_L < T_K$ (for example, $T_K > 30°$ C.) | |
| $T_L \leq -10°$ C. | improbable case |
| $T_L > -10°$ C. to $\leq 0°$ C. | improbable case |
| $T_L > 0°$ C. | slightly greater limitation |
| 6.3 $T_L > T_K$ (for example, $T_K < -20°$ C.) | |
| $T_L \leq 0°$ C. | same RW-limitation as with $T_K$-sensor |
| $T_L > 0°$ | smaller RW-limitation than with $T_K$-sensor (not critical, since with cold start $T_L < 0°$ C.) |

This embodiment presented in table form shows that good emergency driving functions can be obtained with the substitution of the fuel temperature inputs when there is a failure of the fuel temperature sensor by means of the evaluation of the charging air temperature inputs.

It is understood that the foregoing description is that of the preferred embodiments of the invention and that various changes and modifications may be made thereto without departing from the spirit and scope of the invention as defined in the appended claims.

What is claimed is:

1. Method for assuring emergency driving functions with a diesel engine when the fuel temperature sensor fails, the diesel engine being equipped with a charging-air blower and a charging-air temperature sensor, the method comprising: performing a fuel temperature dependent correction of such functions which are dependent upon the fuel temperature $T_K$ by taking the temperature data of the charging air as a basis, the functions including: start control path, starting speed, idle speed, control path correction, and basic quantity control; and, the temperature correction with the charging air temperature ($T_L$) being performed within definite temperature limits such that all functions corresponding to a fuel temperature of $T_K = +20°$ C. are fulfilled at a charging air temperature of $T_L \geq 0°$ C. and all functions corresponding to a fuel temperature of $T_K = -10°$ C. are fulfilled at a charging air temperature of $T_L < 0°$ C.

2. Method for assuring emergency driving functions with a diesel engine when the fuel temperature sensor fails, the diesel engine being equipped with a charging-air blower and a charging air temperature sensor, the method comprising:

utilizing a substitute signal for carrying out the fuel-temperature dependent corrections of fuel-temperature dependent functions with the value of said substitute signal being dependent upon the temperature of the charging air; and, said fuel-temperature dependent functions including at least one of the following: start control path function; starting speed function; idle speed function; control path correction function and quantity control function.

3. The method of claim 2, wherein the value of said substitute signal is dependent in steps on the charging air temperature.

4. Method for assuring emergency driving functions with a diesel engine when the fuel temperature sensor fails, the diesel engine being equipped with a charging-air blower and a charging air temperature sensor, the method comprising:

utilizing a substitute signal for carrying out the fuel-temperature dependent corrections of fuel-temperature dependent functions with the value of said substitute signal being dependent upon the temperature of the charging air;

said fuel-temperature dependent functions including at least one of the following: start control path function; starting speed function; idle speed function; control path correction function and quantity control function; and, said fuel-temperature dependent corrections being performed such that all functions corresponding to a first fuel temperature are fulfilled above a first charging air temperature and all functions corresponding to a second fuel temperature are fulfilled at a charging air temperature below a second charging air temperature.

* * * * *

UNITED STATES PATENT AND TRADEMARK OFFICE
CERTIFICATE OF CORRECTION

PATENT NO. : 4,791,904

DATED : December 20, 1988

INVENTOR(S) : Hermann Grieshaber, Peter Schueler and Jürgen Wietelmann

It is certified that error appears in the above-identified patent and that said Letters Patent is hereby corrected as shown below:

In column 2, line 35, delete "an" and substitute -- and -- therefor.

In column 2, line 40, delete "feel;" and substitute -- fuel; -- therefor.

In column 4, line 9: delete "t" and substitute -- to -- therefor.

In column 5, line 66: delete "require." and substitute -- required. -- therefor.

UNITED STATES PATENT AND TRADEMARK OFFICE
CERTIFICATE OF CORRECTION

PATENT NO. : 4,791,904

DATED : December 20, 1988

INVENTOR(S) : Hermann Grieshaber, Peter Schueler and Jürgen Wietelmann

It is certified that error appears in the above-identified patent and that said Letters Patent is hereby corrected as shown below:

In column 6, the second formula under 3.3: delete "$T_L$ = >-5° C. to < ° C." and substitute -- $T_L$ = >-5° C. to < 0° C. -- therefor.

In column 6, line 22, delete "long" and substitute -- long) -- therefor.

In column 7, line 24, delete "$T_L$(= 16%)." and substitute -- $T_L$(≙ 16%). -- therefor.

In column 7, line 33, "charger" should read --turbocharger--.

Signed and Sealed this

Fifteenth Day of May, 1990

Attest:

HARRY F. MANBECK, JR.

Attesting Officer

Commissioner of Patents and Trademarks